United States Patent [19]

Wagner

[11] E Re. 29,055

[45] Reissued Nov. 30, 1976

BEST AVAILABLE COPY

[54] PUMP AND METHOD OF DRIVING SAME

[76] Inventor: Josef Wagner, Markdorferstr. 165, Friedrichshafen-Spaltenstein, Germany

[22] Filed: Dec. 19, 1974

[21] Appl. No.: 534,653

Related U.S. Patent Documents

Reissue of:

[64] Patent No.: 3,680,981
Issued: Aug. 1, 1972
Appl. No.: 99,823
Filed: Dec. 21, 1970

[52] U.S. Cl. ..... 417/388; 417/395
[51] Int. Cl.[2] ..... F04B 9/08; F04B 9/10
[58] Field of Search ..... 417/388, 387, 395

[56] References Cited

UNITED STATES PATENTS

| | | | |
|---|---|---|---|
| 2,578,746 | 12/1951 | Scherger et al. | 417/388 |
| 3,075,468 | 1/1963 | Eifel | 417/388 |
| 3,601,508 | 8/1971 | Orlita | 417/388 |

*Primary Examiner*—William L. Freeh
*Attorney, Agent, or Firm*—Hill, Gross, Simpson, Van Santen, Steadman, Chiara & Simpson

[57] ABSTRACT

A fluid transfer device such as a reciprocating pump, preferably of the diaphragm type suitable for use with an airless spray-gun for painting and the like, having a pumping side for the fluid to be pumped and a driving side driven through a piston through a solution or mixture of liquid and gas, such as oil and air. Under throttled or standby operation conditions, reduced diaphragm movement is accommodated without changing the piston stroke by reducing the volume of the driving liquid and by releasing gas from the reduced volume of liquid to prevent vaporization and condensation of the driving fluid itself. A dead space is provided on the pumping side allowing some diaphragm movement into the pumping side even when completely closed so that only a small proportion of driving liquid is released and only a small amount of gas is freed from the driving liquid to accommodate the reduced diaphragm movement during the full piston stroke. The loading and unloading of the driving fluid on the power and suction strokes of the piston is controlled so that the driving fluid is always above its vapor pressure. The gas is released from the driving liquid according to Henry's Law.

48 Claims, 9 Drawing Figures

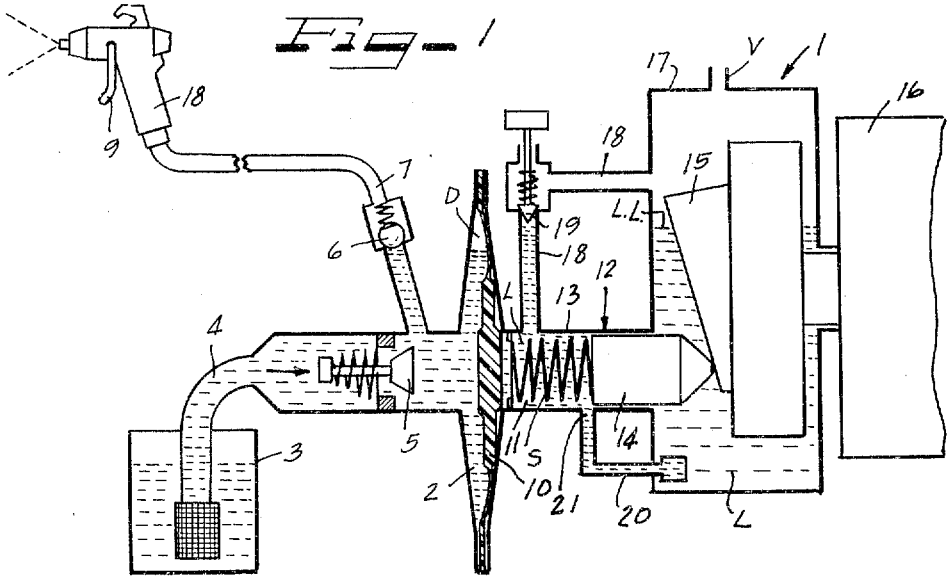
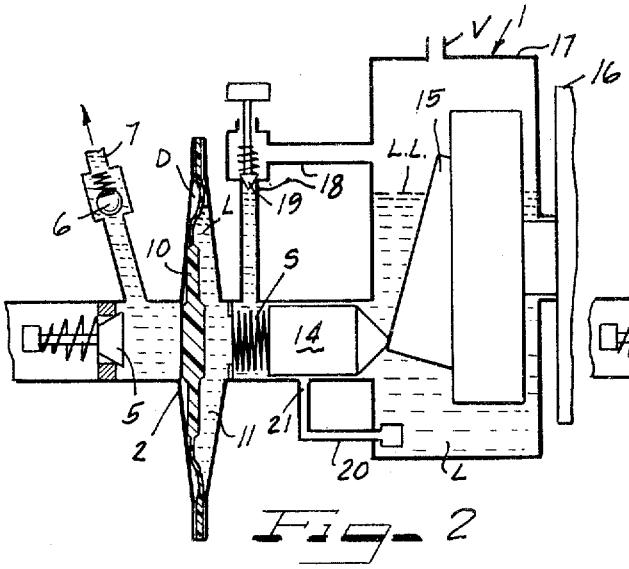
Fig. 2
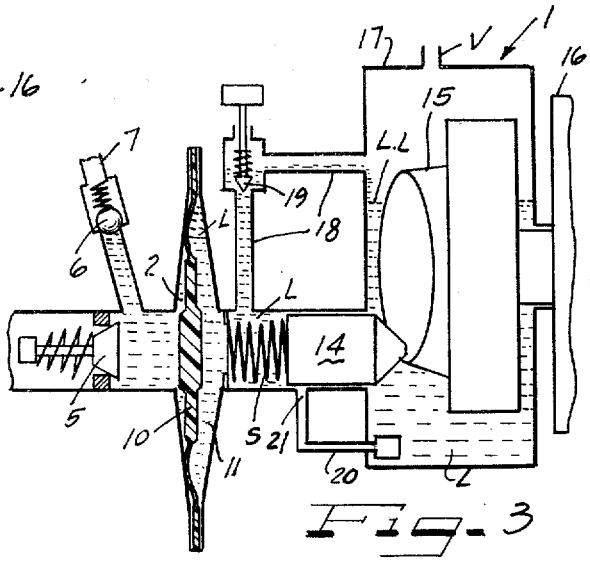
Fig. 3
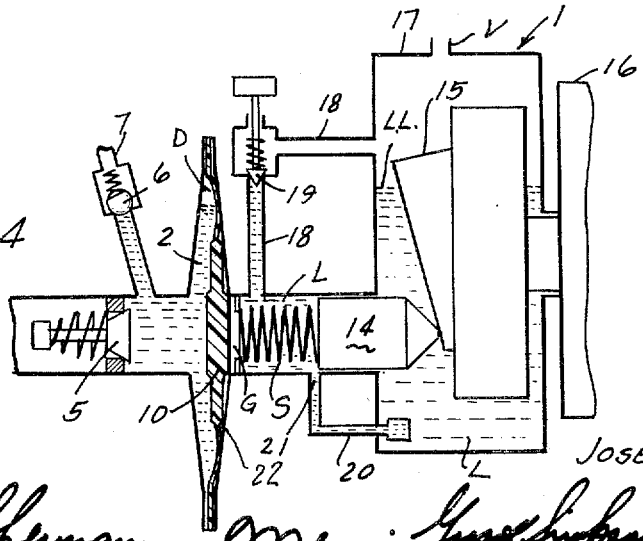
Fig. 4
INVENTOR.
JOSEF WAGNER
BY Hill, Sherman, Meroni, Gross & Simpson ATTORNEYS

INVENTOR.
JOSEF WAGNER

BY Hill, Sherman, Meroni, Gross & Simpson ATTORNEYS

Fig. 6
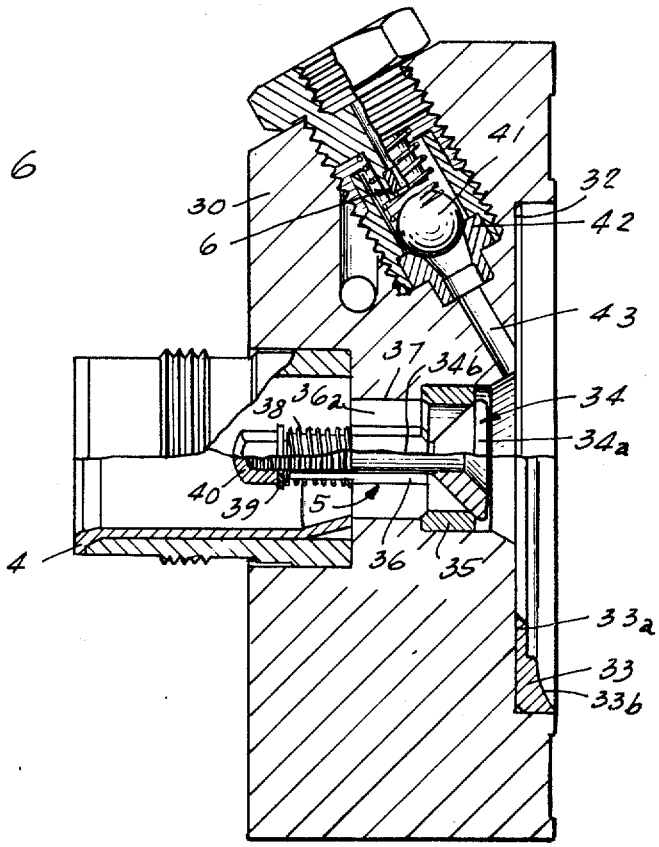
Fig. 8
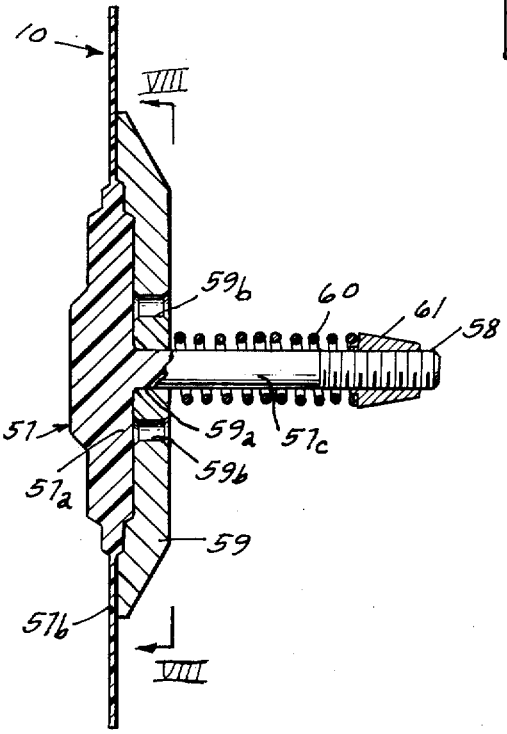
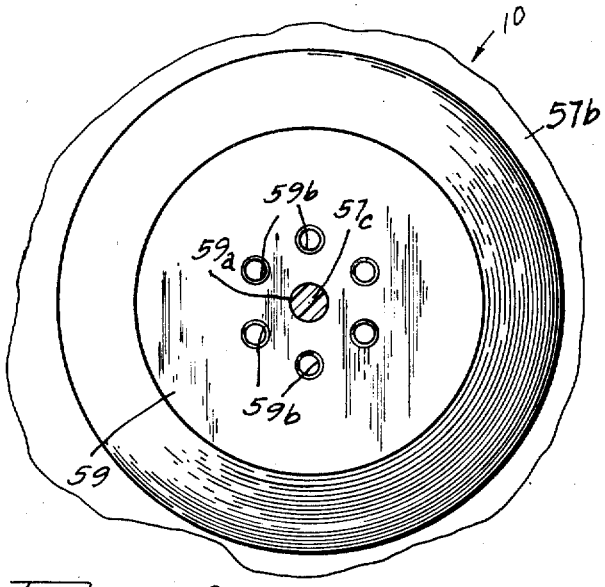
Fig. 9
INVENTOR.
JOSEF WAGNER
BY Hill, Sherman, Meroni, Gross & Simpson ATTORNEYS

INVENTOR.
JOSEF WAGNER

BY Hill, Sherman, Meroni, Gross & Simpson ATTORNEYS

PUMP AND METHOD OF DRIVING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to the art of pumping and particularly to diaphragm pumps for paint spraying and the like usage.

2. Description of the Prior Art

Diaphragm pumps driven by liquids which vaporize during the suction stroke of the pump are known in the art, for example in the Paul W. Schlosser U.S. Pat. No. 3,254,845 granted June 7, 1966. These pumps utilize cavitation to effect vaporization and condensation of the driving liquid. The repeated vaporization and condensation causes rapid erosion and corrosion of the pump parts and useful driving fluids are limited to low boiling liquids.

SUMMARY OF THE INVENTION

The deficiencies of the prior art liquid driven diaphragm pumps are completely eliminated and improved pumping efficiency and useful pump life are provided by this invention which eliminates vaporization and condensation of driving liquid in a liquid driven diaphragm pump. According to this invention, the pump diaphragm is variably driven from a reciprocating piston having a constant stroke through a variable volume of liquid having a gas dissolved therein under conditions which never allow the liquid to vaporize and which operate according to Henry's Law. While it is preferred that the driving liquid have the gas dissolved therein under one phase of operation, it is possible to use a driving liquid composed of a mixture of liquid and undissolved gas which expand under certain operating conditions.

An important feature of this invention is the complete elimination of vaporization of driving liquid in the operation of a liquid driven diaphragm pump and the maintenance of the liquid phase of the driving liquid at all times.

Another important feature of this invention is the provision of a dead space occupied only by air, paint solvent vapor or the like compressible material, on the pumping side of the diaphragm which allows the diaphragm to move to prevent vaporization of driving liquid even under conditions where the flow of liquid being pumped is throttled or completely stopped. In spray-gun usage of the pumps of this invention, interruption of the flow of paint or the like being pumped is sudden and may be quite frequent. Displacement of the diaphragm at least partially into the pumping chamber during these sudden stop periods provides for an enlarged volume in the driving liquid chamber with a reduced overflow of driving liquid on the first power stroke following throttling or shut-off so that the next suction stroke cannot result in vaporization of any driving liquid because sufficient gas will be released from the liquid to fill the chamber without reducing pressure sufficient to accommodate boiling of the liquid.

More particularly, according to this invention, the driving liquid is preferably a lubricant such as oil and the gas is preferably air dissolved in this oil. Under atmospheric temperature and pressure conditions, about 4–8 % by volume of air is dissolved in a lubricating oil of relatively low viscosity and relatively high boiling point. A light hydraulic oil is satisfactory. Gases other than air might be dissolved in a suitable driving liquid, such as for example, nitrogen, oxygen, hydrogen, carbon dioxide and the like. Where lubrication is not a problem, the driving liquid may be water.

In general, the gas containing driving liquid is maintained under temperature and pressure conditions which will allow release of the dissolved or entrained gas only on the suction stroke of the pump following the throttling or stoppage of the pumping operation. The released gas is reintroduced into the driving liquid upon resumption of the pumping operation.

To ensure against possible vaporization of the driving liquid, the pressure of the driving liquid is never released to a point even close to the vapor pressure of the liquid and the pressure is maintained from 10 to 100 times the pressure at which vaporization could occur.

Temperatures of the driving fluid are maintained sufficiently low to avoid vaporization even at the lowest operating pressures by reducing any required recirculating of the driving fluid to a minimum.

After throttling or complete stoppage of flow of the liquid being pumped, the remaining volume in the driving liquid chamber is harmonized with the piston stroke so that the lowest pressure produced on the suction stroke of the piston remains above the boiling pressure of the driving liquid and the return stroke volume of the chamber is completed with gas freed or expanded from the driving liquid thereby preventing vaporization. At the end of the suction stroke the driving liquid chamber is completely filled with a mixture of the driving liquid and the released gas.

To ensure that this remaining volume of the driving liquid is sufficiently great to contain enough gas for completely filling the driving liquid chamber, the aforementioned dead space is provided in the pumping chamber even during full pumping operation so that diaphragm movement into the pumping chamber is not completely stopped even upon full throttled no-flow standby conditions.

The pumping chamber is fed througn an inlet check valve and the pumped liquid is withdrawn through an outlet check valve and a control valve such as a spray-gun. The chamber on the opposite side of the diaphragm containing the driving liquid and the driving piston is connected to a source chamber through a bypass with a pressure limiting valve and through a refill passage for replenishing the pumping liquid. The pressure limiting valve is adjustable to control the delivery pressure of the pump.

The pump piston must not be retracted during the suction stroke with too great a velocity since the gas dissolved or entrapped in the liquid may not be given enough time to be freed from the liquid. If the suction stroke proceeds at a rate slow enough to release the dissolved or entrapped gas, only enough gas will be freed to maintain a constant stroke without ever releasing the pressure sufficient to permit boiling of the driving liquid. The gas separation thus obeys the law of Henry, and it is only when the pump piston is withdrawn with too great a velocity that a hollow space created ahead of the piston may be filled with vapor of the driving liquid which during the next pressure stroke, of course, leads to the undesirable cavitation. The maximum pump velocity is chosen so that the law of Henry may apply to the freeing of the gas. Preferably, the piston should not have a retracting velocity above 1.0 to 1.5 meters per second.

To prevent the dead space in the pumping chamber from becoming filled with the pumping liquid during the subsequent suction strokes after a throttling or stoppage of flow of pumping liquid, a spring loaded inlet valve is preferably provided such that the spring characteristic and the mass inertia of the valve will not permit the valve to be opened by reduced pressure in the dead space of the pumping chamber. A spring having a rate of 75 grams per millimeter and a closing load of 300 grams is sufficient to maintain the dead space.

It is then an object of this invention to provide an improved diaphragm pump capable of being fully throttled and method of pumping through a driving liquid without vaporizing the driving liquid.

Another object of this invention is to provide a liquid driven diaphragm pump, useful for spray painting, having a wide range of delivery pressures and delivery rates without bypassing the material being pumped and without effecting vaporization of the driving liquid.

A further object of this invention is to provide a method of driving a diaphragm or the like through a liquid containing a dissolved or admixed gas freed during a throttling of the diaphragm stroke to prevent vaporization of the driving liquid.

A still further object of the invention is to provide a liquid driven diaphragm pump operating according to the law of Henry.

Another object of the invention is to provide a diaphragm pump with a dead space on the pumping side of the diaphragm which will accommodate movement of the diaphragm even when flow of the pumping liquid is stopped.

Another object of the invention is to provide a diaphragm type paint spray pump with an inlet valve so correlated with a liquid driven diaphragm as to maintain a void filled only with compressible air, vapors or the like in the pumping chamber during all conditions of operation.

A still further object of the invention is to provide a diaphragm pump driven by a constant stroke reciprocating piston through a lubricating liquid having a gas dissolved therein which is released from the liquid when the pumping operation is throttled or stopped.

Another object of the invention is to provide a diaphragm pump driven by a constant stroke reciprocating piston through a lubricating liquid having a gas dissolved therein and a dead space on the pumping side of the diaphragm so correlated with an inlet valve as to accommodate limited movement of the diaphragm when flow of the pump material is stopped so that only a small amount of the driving liquid need be released to accommodate the limited stroke of the diaphragm.

Other and further objects of this invention will become apparent to those skilled in this art from the following detailed descriptions of the annexed sheets of drawings which, by way of a preferred embodiment, show one form of the invention.

BRIEF DESCRIPTION OF THE DRAWINGS

FIG. 1 is a somewhat diagrammatic longitudinal sectional view with parts in elevation of a diaphragm pump according to this invention for pumping paint to a spray-gun and illustrating the positions of the parts at the end of a suction stroke;

FIG. 2 is a view similar to FIG. 1 but illustrating the positions of the parts at the end of a pressure stroke;

FIG. 3 is a view similar to FIGS. 1 and 2 but illustrating the position of the parts during a pressure stroke following full throttling of the pumping operation;

FIG. 4 is a view similar to FIGS. 1 to 3 but illustrating the positions of the parts and the condition of the driving fluid at the end of a suction stroke following a pressure stroke after full throttling, as shown in FIG. 3;

FIG. 6 is an enlarged longitudinal sectional view of the pumping side of the pump of FIG. 4;

FIG. 8 is an enlarged side elevational detail view with parts shown in cross-section of the diaphragm and support plate of the pump of FIG. 4;

FIG. 9 is a plan view of the support plate taken along the line IX—IX of FIG. 8.

DETAILED DESCRIPTION OF THE DRAWINGS

Figure 5:
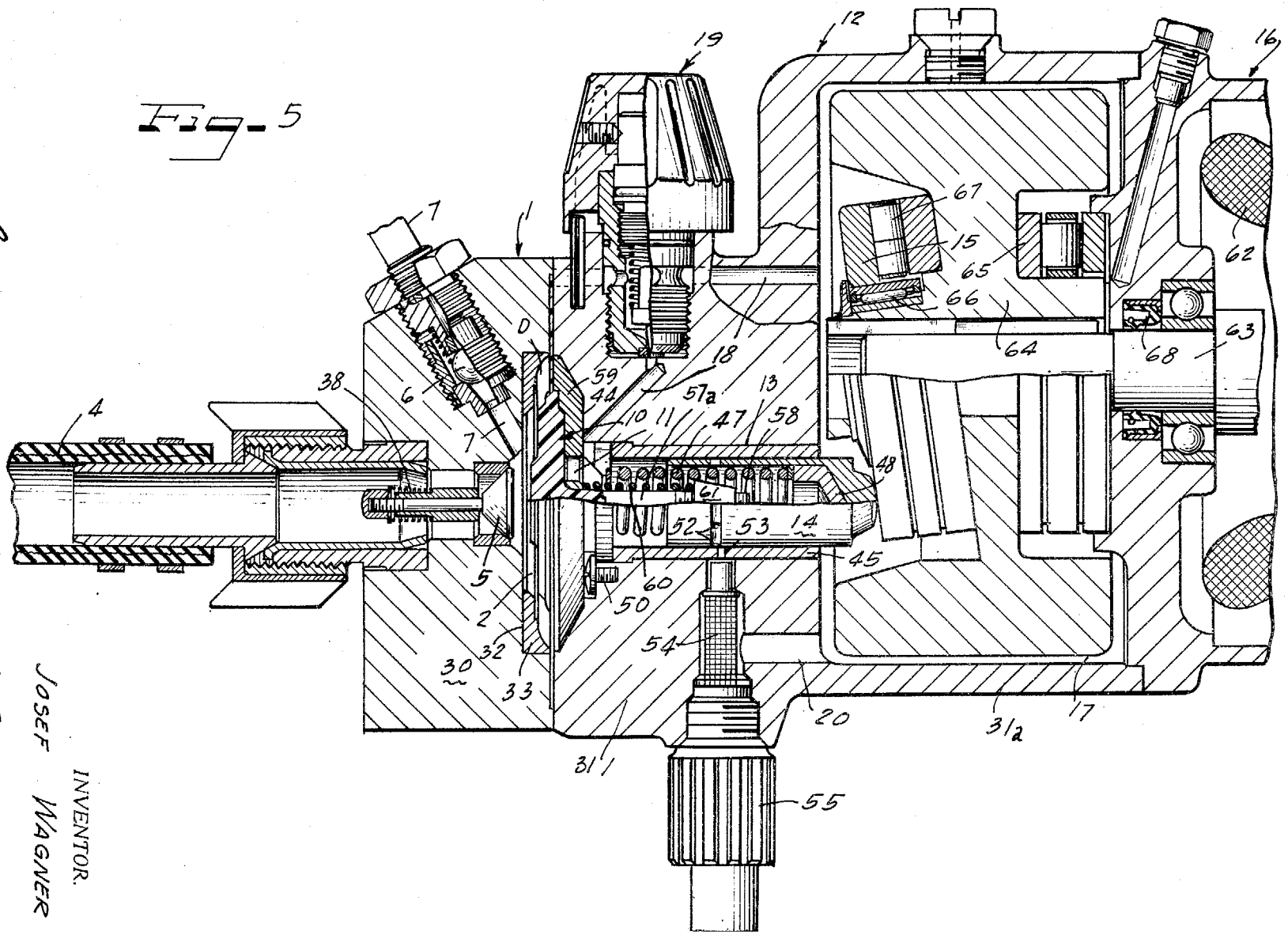
FIG. 5 is a longitudinal cross-sectional view, with parts in elevation and with parts broken away, of one form of diaphragm pump according to this invention.

In FIG. 1 there is schematically illustrated a diaphragm pump 1 according to this invention having a casing defining a first or pumping chamber 2 fed from a supply container 3 with liquid to be pumped such as paint or the like. Liquid from the container 3 is supplied to the chamber 2 through an inlet pipe 4 and inlet check valve 5. The pressurized liquid or pumpage is discharged through an outlet check valve 6 to a supply hose 7 to a paint spray-gun 8 having a control valve 9 throttling or completely stopping flow from the pumping chamber 2.

The pump 1 has an axially movable diaphragm 10 forming one wall of the chamber 2 and separating this chamber from a driving liquid chamber 11 to which driving pressure is intermittently applied and relieved by means of a piston pump generally identified at 12 and including a cylindrical chamber 13 slidably mounting a cylindrical piston 14 driven by a wobble plate 15 rotated by a driving motor 16.

The wobble plate 15 rotates in a container 17 for the driving liquid which communicates with the driving liquid chamber 11 behind the diaphragm 10 by means of an overflow passage 18 containing an adjustable pressure limiting valve 19. A refill passage 20 also joins the bottom portion of the container 17 with a refill slot 21 in the cylindrical chamber 13 receiving the piston 14. The slot 21 is uncovered by the piston 14 only at the end of the suction stroke of the piston and is otherwise closed by the piston.

The container 17 is partially filled with the driving liquid L to a liquid level LL, and the top of the chamber 17 may be vented to the atmosphere as at V. A spring S urges the piston 14 against the wobble plate 15. The wobble plate 15 in the container 17 agitates the liquid L insuring aeration with air from vent V.

The wobble plate 15 drives the piston 14 through a relatively short stroke from the rearmost suction stroke illustrated in FIG. 1 to the forward end of the power stroke illustrated in FIG. 2, and this reciprocation of the piston drives the liquid L ahead of the piston forcing the diaphragm 10 from its rearmost position in the chamber 11 as shown in FIG. 1 to its foremost position in the chamber 2, as illustrated in FIG. 2. The loss of driving liquid by leakage past the piston 14 is replenished on each driving stroke through the refill slot 21.

When the valve 9 of the spray-gun 8 throttles the full discharge through the outlet hose 7, the displacement of the diaphragm 10 is reduced and since at the moment of throttling the driving liquid behind the diaphragm in the chamber 11 is sufficient to force a full diaphragm stroke or displacement, some of the driving liquid must be displaced from the chamber so that the remaining portion will permit the reduced stroke of the diaphragm. For this purpose, the pressure limiting valve 19 in the return or overflow passage 18 is a spring loaded needle valve which is unseated on the first pressure stroke of the piston 14 following throttling or stoppage of flow from the pumping chamber 2.

As shown in FIGS. 1 and 2, the volume of the driving liquid behind the diaphragm remains constant when the pump is operated at capacity under a full stroke of the diaphragm. However, as shown in FIG. 3, when flow from the pumping chamber 2 is throttled or stopped, the diaphragm movement is reduced and the volume of the driving fluid behind the diaphragm must be reduced because the stroke of the piston remains the same. Thus, the needle valve 19 will open, allowing escape of driving fluid back to the container 17 only in an amount sufficient to reduce the volume of liquid behind the diaphragm for accommodating the reduced displacement of the diaphragm into the pumping chamber caused by the throttling of the discharge from the pumping chamber. The valve 19 will only open under the increased pressure created in the pumping chamber 2 and in turn on the driving liquid by the throttling. Then, on the suction or return stroke of the piston 14 the valve 19 will immediately close and since the piston 14 moves through a full stroke, there will be insufficient driving liquid remaining between the piston and diaphragm to fill the chamber 11 and the cylinder space ahead of the piston. Under these conditions, as shown in FIG. 4, the pressure on the driving liquid is reduced and the gas dissolved in the liquid is released according to the law of Henry to fill the chamber with gas G and liquid L without ever allowing the liquid L to vaporize. Thus, the remaining volume of the mixture of gas and driving liquid is automatically adjusted during the suction stroke to fill the reduced chamber caused by the reduced movement of the diaphragm.

If leakage should occur during further working strokes of the piston pump following initial throttling since the pressure in the chamber 11 at the end of the suction stroke of the pump piston as illustrated in FIG. 1 will be lower than the pressure in the supply container, 17, a small amount of replacement driving liquid is fed to the chamber through the passageway 20 only during the short time when the slot 21 is uncovered by the piston. In the event excess liquid is supplied through the refill passage 20, it will be returned to the container 17 through the passageway 18 since the resulting increased pressure in the chamber 11 will reopen the spring loaded needle valve 19 for this purpose.

When the throttle valve 9 of the spray-gun 8 is again fully opened so that full pumping performance of the pump 11 is permitted, the outlet check valve 6 will open reducing the pressure in the pumping chamber 2 and again allowing the diaphragm 10 to resume its full stroke. The driving liquid behind the diaphragm is then replenished from the container 17 via the passage 20 and slot 21 until the volume of the driving liquid again fills the chamber 11 and the gas is again dissolved into the driving liquid. Each working stroke of the piston 14 decreases the amount of freed gas in the chamber 11 until full pumping operation is again achieved.

To minimize return of pumping liquid from the chamber 11 back to the container 17 and to thereby decrease freeing of gas from the driving liquid to fill the chamber behind the diaphragm, the diaphragm is arranged so that it will always have some movement on a pressure stroke even when the throttle valve 9 of the spray-gun is completely closed and no discharge is permitted from the pumping chamber 2. To accomplish this movement of the diaphragm 10 into the pumping chamber 2 even under complete stoppage of discharge from the pumping chamber, the inlet check valve 5 is sufficiently biased to a closed position and the walls of the pumping chamber are so shaped that the pumping chamber 2 will never be completely filled and a dead space or void will be provided in the pumping chamber as illustrated at D around the periphery of the pumping chamber. Then, even though the valves 5 and 6 are completely closed trapping incompressible pumpage such as liquid paint in the chamber 2, the air or paint solvent vapor in the dead space D can still be compressed on the pressure stroke of the diaphragm to permit some displacement of the diaphragm into the pumping chamber. This displacement of the diaphragm even under fully closed outlet operation of the pump maintains the volume in the driving liquid chamber 11 closer to the volume of the chamber under fully opened pumping operation so that only a small overflow of liquid through the passage 18 will be needed to accommodate the reduced volume in the driving liquid chamber from the full pumping volume of the chamber. This, of course, reduces the amount of gas freed from the liquid required to fill the remaining volume of the driving chamber.

It will be understood that the pressure stroke of the pump piston 14 following a complete closing of the throttle valve 9 urges the diaphragm 10 through a complete stroke and this compresses the pumping liquid present in the chamber 2 an amount permitted by the dead space or void. If this pressure in the chamber 2 exceeds the pressure of the limiting valve 19 on the driving side of the diaphragm, some driving liquid will be returned to the supply container 17. Then on the following suction stroke, the pump piston 14 moves the diaphragm to rest against a support plate 22 as shown in FIG. 4, and the continued suction stroke decreases the pressure on the driving liquid to release the gas therefom. When the pressure at the end of the suction stroke has decreased the pressure in the driving chamber 11 to a point where it is below the pressure of the supply container 17, additional liquid will be supplied through the refill passage 20 when the slot 21 is uncovered by the piston. Then in a subsequent pressure stroke, the previously freed air in the chamber 11 is redissolved into the driving liquid and the diaphragm is moved into the pumping chamber 2 an amount permitted by the dead space until the pressure of the driving liquid is again increased sufficiently to open the pressure limiting valve. Then, on the next suction stroke the diaphragm 10 is again caused to bottom on the support disc 22 which will reduce the pressure in chamber 2 a small amount insufficient to open the check valve 5. Any leakage during the following strokes of the pump piston 14 is replenished from the supply container 17 through the refill passage 20 and slot 21.

In no event during the operation of the pump as illustrated in FIGS. 1 to 4 can vaporization occur in the pumping chamber 11, nor will the diaphragm movement be completely arrested even during standby operation where the throttle valve is completely closed. Thus, the pumping chamber 2 is never completely filled with the pumping liquid and the diaphragm never rests firmly against the wall of this chamber. In this manner, the remaining volume of the driving liquid in the chamber 11 may be maintained at a maximum and more than a sufficient supply of air from the driving liquid is available to prevent vaporization in the chamber 11. The heretofore encountered erosion and corrosion caused by vaporization in liquid driven diaphragm pumps is thus completely eliminated.

In the detailed drawings of FIGS. 5 through 8, parts corresponding with parts illustrated in FIGS. 1 to 4 have been marked with the same reference numerals.

Figure 7:
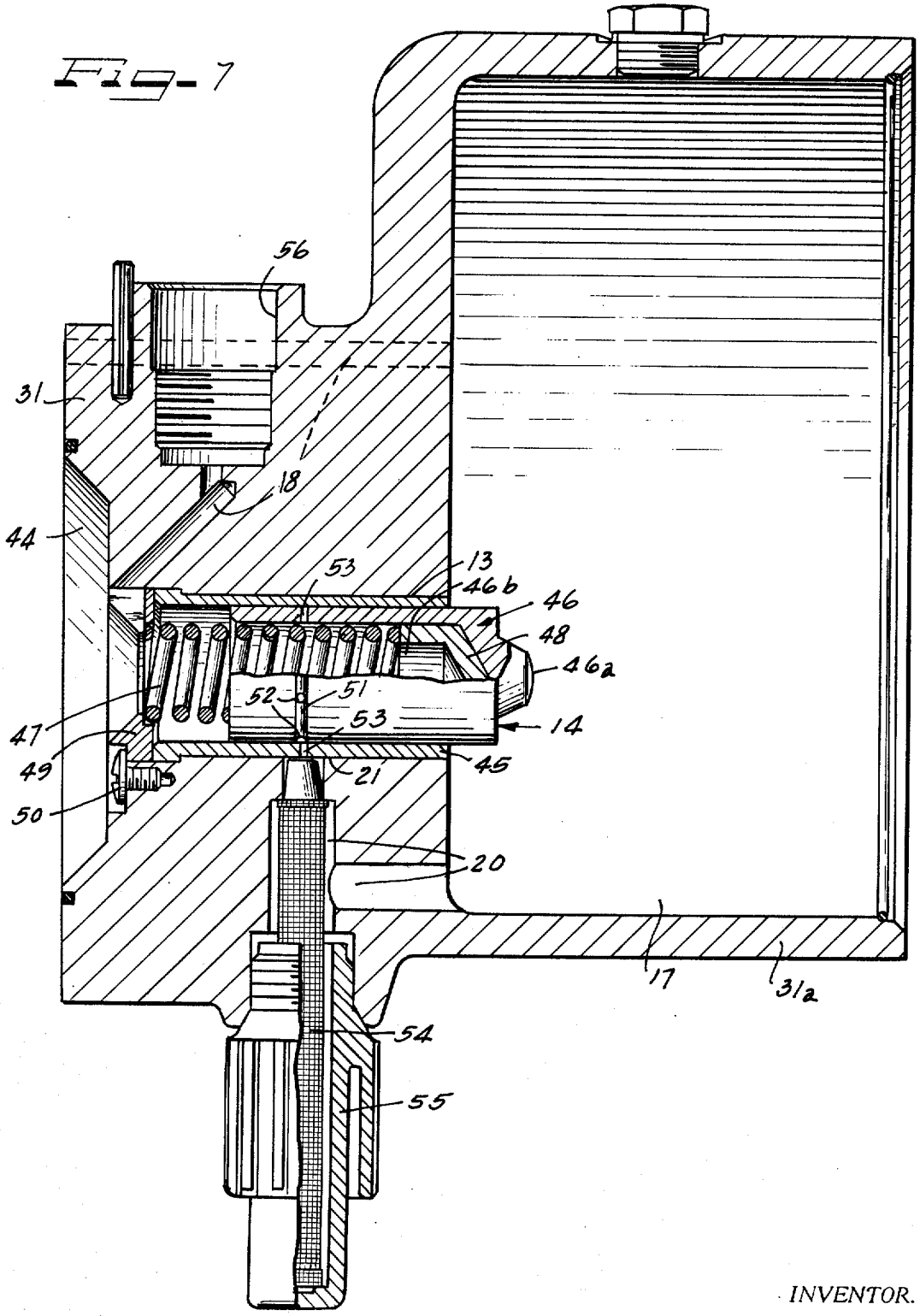
FIG. 7 is an enlarged longitudinal sectional view of the driving side of the pump of FIG. 4.

The casing for the pump 1 as shown in FIG. 5 is formed from two half sections 30 and 31 shown separately in FIGS. 6 and 7. The half section 30 as best shown in FIG. 6 has a recess 32 in the face thereof mating with the opposing face of the section 31. This recess 32 receives an insert 33 preferably composed of corrosion and erosion resisting plastic material such as "Teflon" (polytetrafluoroethylene) or polypropylene. The exposed face of the plastic ring 33 is contoured around its inner peripheral portion 33a to provide a seat for the diaphragm 10 as hereinafter more fully explained and is recessed around its outer peripheral face portion as at 33b to provide for the aforementioned dead space.

The inlet valve 5 includes a poppet valve 34 with a head 34a seating on a valve seat insert ring 35 and with a stem 34b slidably mounted in the bore of a plastic bearing 36 which has radiating fins or webs 36a pressed in the inlet bore 37 of the casing part 30. A coil spring 38 surrounds the plastic bearing 36 and is bottomed at one end against the fins 36a and at the other end against a washer 39 backed by a nut 40 threaded on the valve stem 34b. Liquid such as paint from the inlet 4 flows around the bearing 36 through the spaces between the ribs 36a thereof to the head 34a which when seated on the ring 35 will seal off the inlet of paint to the pumping chamber 2 and which when opened will allow flow of paint into this pumping chamber.

The outlet check valve 6 as shown includes a spring pressed ball 41 cooperating with a seat 42.

The casing 30 has a passage 43 from the pumping chamber to the spring pressed ball 41.

The pump casing part 31 shown in FIG. 7 has a recess 44 in the face thereof mating with the casing half 30 and this recess receives a diaphragm support plate as hereinafter described.

The cylinder bore 13 receiving the piston 14 is lined with a sleeve 45 slidably supporting the piston which is in the form of a hollow cup 46, the closed or head end of which has a projecting nose 46a for engaging the wobble plate 15 and the hollow interior 46b of which receives a spring 47 bottomed at one end against a plastic spacer 48 seated against the head and at the other end against a metal spring retaining collar 49 held in abutted relation against the end of the sleeve 45 by a fastener 50 threaded into the casing 31.

The piston cup 46 has a groove 51 around the periphery thereof and holes 52 through the bottom of the groove connect the groove to the interior of the cup 46b. The cylinder sleeve 45 has holes 53 at spaced intervals therearound adapted to register with the groove 51 when the piston reaches the end of its suction stroke as above described. These holes 53 through the sleeve 45 communicate with the refill slot 21 decribed above and the refill passage 20 to the container 17. A cylindrical filter screen 54 is provided in the passage 20 and may conveniently be carried in a casing 55 threaded into the casing part 31 and easily removed therefrom for cleaning.

The container 17 shown in FIG. 17 is defined by an integral cylindrical wall 31a of the casing part 31. The overflow passage 18 as shown in FIG. 7 is provided by two drilled holes in the casing connected through a well 56 receiving the spring loaded needle valve 19 described above.

As shown in FIG. 8, the diaphragm 10 is a molded plastic unit 57 having a thick rigid central portion 57a surrounded by a thin flexible peripheral membrane portion 57b. A cylindrical stem 57c extends from the center of the thick portion 57a and has a threaded end 58. One face of the thick portion 57a is stepped to mate with the step portion 33a on the inner periphery of the insert ring 33 shown in FIG. 6. The opposite face of this central portion 57a is contoured to mate with the face of a metal backup or support plate ring 59 which in turn is seated in and mates with the recess 44 of the casing part 31 shown in FIG. 7. This support plate 59 has a central aperture 59a slidably receiving the stem 57c therethrough and this aperture 59a is surrounded by a ring of apertures 59b as shown in FIG. 9 for passage of driving liquid through the support plate 59.

As shown in FIG. 8, a coil spring 60 surrounds the stem 57c and a nut 61 threaded on the end 58 of the stem compresses the spring 60 against the support plate 59, thereby drawing the diaphragm 57 into seated relation on this support plate.

As shown in FIG. 5, the stem 57a and spring 60 extend into the spring 47 in the cup portion 46b of the piston. In this manner, the piston is biased against the wobble plate 15 while the diaphragm is biased against the support plate 59. The diaphragm 10 is thus always biased away from the insert ring 33.

The motor 16, as illustrated in FIG. 5, is in the form of an electric motor 62 driving a shaft 63 on which is keyed a flywheel 64 in the container 17. A thrust bearing 65 rotatably supports the flywheel 64 in the container and the wobble plate 15 is mounted in angled relation on this flywheel through radial bearing 66 and thrust bearing 67. A seal 68 is provided around the shaft 63 to stop leakage between the motor and container 17.

When the motor is driven to rotate the wobble plate 15, the piston 14 will be moved forwardly from its rearmost position shown in FIG. 5 against the bias of the spring 47 and will act through the driving liquid to force the diaphragm 10 off of the seating plate 59. The forward movement of the diaphragm in the pumping chamber 2 will discharge paint from the pumping chamber past the check valve 6 to the spray-gun outlet. Then, on the return stroke the diaphragm 10 will be biased back to the position shown in FIG. 5 enlarging the pumping chamber 2 and drawing paint from the inlet 4 through the inlet valve 5. The load of the spring 38 on this inlet valve 5 is such that the valve will not open on the initial retraction of the diaphragm so that the pumping chamber 2 is never filled with a liquid material and the dead space D will be preserved. The contour 33b of the insert ring 33 and the thin membrane portion 57b overlying this contoured portion cooperate with the spring load on the inlet valve to maintain this small dead space D.

In one commercial embodiment of a diaphragm pump for airless spray painting usage according to this invention, the pump chamber 2 of the pump has a capacity of about 19 cc., the outlet check valve 6 is spring loaded at about 150 grams with the spring having a rate of 60 grams/m.m. and the inlet valve 5 is spring loaded at about 300 grams with a spring rate of 75 grams/mm. The diaphragm 10 is spring biased into the chamber 11 by spring 60 at 23.4 kilgrams with a rate of 2.93 kg/m.m. When the relief valve 19 is set to open at 240 kg, this pump will deliver a pressure of about 150 kg/cc$^2$ to a spray-gun 8 having a delivery orifice diameter of 0.31 inches. The relief valve 19 may be varied to open at different pressures with a resultant variation in delivery pressure. The orifice size on the spray-gun 8 may be changed to vary the delivery pressure at the same relief valve setting. The piston 14 has a stroke of about 8 m.m. and the wobble plate 15 is driven at about 1,480 RPM. When such a pump is fully throttled to stop flow from the pumping chamber 2, the amount of driving fluid released through the valve 19 will not be more than about 6 percent of the volume of driving liquid in the chamber 11. Then, when the spray-gun 8 is opened for full delivery, the driving liquid will be replenished through the passage 20 at the rate of about 0.45 c.c. on each stroke of the piston 14 until the chamber is again filled with the driving liquid and the gate is re-dissolved in this liquid. The wobble plate drive has a wide speed range and is driven slow enough so that the piston cannot retract at a faster rate than the gas can be released.

It should be understood that the pump form of FIGS. 5 through 9 represents only one embodiment of the pump of this invention, and details of construction may be widely varied from this illustrated form without departing from the principles and scope of this invention.

It should be understood that the herein described diaphragm is a preferred fluid propelling member but it could be replaced with a piston, a bellows or the like fluid propelling device without departing from the principles and scope of this invention.

It should be understood that while the invention is particularly described as embodied in a pump, the principles of the invention are generally useful in fluid power transfer machines including motors as well as fluid propelling machines and such usage is included within the scope of this invention.

I claim as my invention:

1. A driven fluid pump device adapted to be throttled and stopped without throttling or stopping the driving input which comprises, means defining a pumping chamber and a [ driven ] *driving* fluid chamber, a fluid propelling member separating said chambers, a driving fluid in said driving fluid chamber actuating said member and composed of liquid and gas, driving means for alternately pressure loading and unloading said driving fluid, means for releasing some of said driving fluid when loaded above a predetermined pressure to provide a reduced driving volume for reduced actuation of said propelling member, and means maintaining minimum pressure on the driving fluid above the vapor pressure of said fluid whereby any expansion of the reduced driving volume upon unloading will be accommodated by the remaining liquid and gas released therefrom.

2. The device of claim 1 wherein the driving fluid is a liquid having a gas dissolved therein which is released therefrom according to the law of Henry.

3. The device of claim 2 wherein the liquid is a lubricant and the gas is air.

4. The device of claim 1 wherein the fluid propelling member is a diaphragm.

5. The device of claim 1 wherein the driving means is a piston.

6. The device of claim 5 wherein the piston has a uniform stroke.

7. The device of claim 5 wherein the piston is driven by an eccentric member.

8. The pump device of claim 1 wherein the fluid propelling member receives pumpage on one side and said driving fluid on the other side, *the pumping chamber has a dead space on the pumpage side* and an inlet valve controls flow of pumpage to *thereby* maintain [ a ] *said* space on the pumpage side of said fluid propelling member accommodating movement of the member to lessen reduction of the driving volume of said driving fluid during standby operation when no flow of pumpage occurs.

9. The device of claim 8 wherein the fluid propelling member is a diaphragm having a pumpage chamber on one side and a driving fluid chamber on the other side, an inlet valve controls flow of pumpage into the pumpage chamber, a check valve controls flow out of the pumpage chamber, and said two valves cooperate to prevent the pumpage chamber from being completely filled to maintain [ a ] *said* dead space [ of ] *for* compressible fluid accommodating movement of the diaphragm into the pumpage chamber during throttling or stopping of the pumping.

10. The device of claim 1 including a supply chamber for driving fluid and a spring loaded valve controlling release of driving fluid to said supply chamber.

11. The device of claim 10 wherein a passageway selectively connects the supply chamber with the driving fluid chamber ahead of the driving means for replenishing said chamber.

12. A driven pump adapted to be throttled or stopped without throttling or stopping the driving input comprising a housing defining a pumping chamber and a driving liquid chamber, a fluid propelling *diaphragm* member separating said chambers, driving means acting on liquid in the driving liquid chamber to actuate said propelling member for pumping fluid through the pumping chamber, a relief valve controlling maximum pressure in said driving liquid chamber and releasing excess liquid from the chamber to accommodate throttled movement of the diaphragm, and means controlling the driving means to maintain pressure on the remaining liquid in the driving liquid chamber above the vapor pressure of the liquid.

13. The pump of claim 12 having a source of driving liquid containing gas dissolved therein communicating with said relief valve to receive excess driving liquid from the driving liquid chamber, and means connecting said source with the driving liquid chamber to replenish the chamber whenever pressure therein is below the pressure of the source.

14. The pump of claim 12 wherein the pumping chamber is fed through an inlet valve biased to closed position to maintain a dead space accommodating movement of the fluid propelling member into the pumping chamber even when the chamber is closed.

15. The pump of claim 12 wherein [ the fluid propelling member is a diaphragm and ] the driving means is a constant stroke piston.

16. A driven diaphragm pump adapted to be throttled and stopped without throttling or stopping the driving input which comprises a housing having a diaphragm chamber, a diaphragm in said housing spanning said chamber and dividing the chamber into a pumping chamber *having a dead space* and an opposed driving liquid chamber, a spring biased inlet valve for admitting pumpage to said pumping chamber, an outlet valve controlling flow of pumpage from said pumping chamber, a source of lubricating liquid having air dissolved therein, means bleeding liquid from said source to said driving chamber, a relief valve controlling flow of liquid from the driving chamber back to the source, a piston acting on liquid in said driving chamber to load and unload said liquid for reciprocating said diaphragm to draw pumpage through the inlet valve into said pumping chamber and to discharge pumpage from the pumping chamber through the outlet valve, means driving said piston through a stroke to act through the liquid for forcing a full stroke of the diaphragm whenever pressure in the pumping chamber is below the pressure of the driving liquid, said relief valve releasing driving liquid from the driving chamber back to the source when pressure in the pumping chamber exceeds pressure on the driving liquid, the spring load on said inlet valve to the pumping chamber being effective to *limit flow of pumpage to* maintain [ a ] *said* dead space in the pumping chamber accommodating movement of the diaphragm into the pumping chamber even when the outlet valve is closed thereby minimizing release of driving liquid through the relief valve upon throttled operation of the pump, and means limiting the stroke of the piston to maintain the driving liquid volume less than a volume occupied by the liquid and available air from the liquid to always sustain the liquid above its vapor pressure whereby reduced throttled diaphragm strokes are accommodated by reducing the volume of driving liquid and releasing air from the reduced volume of liquid to prevent vaporization of the liquid.

17. The pump of claim 16 wherein the piston closes the bleeding means except at the end of its suction stroke.

18. The pump of claim 16 wherein the piston is spring biased against a wobble plate providing the driving input.

19. The pump of claim 16 wherein the outlet valve is in a spray-gun receiving pumpage from the pumping chamber.

20. A diaphragm pump comprising a housing defining a chamber for a source of lubricating liquid containing dissolved air, a driving chamber for said liquid and a pumping chamber, a diaphragm separating said driving and pumping chambers, a piston separating said source and driving chambers, means reciprocating said piston to load and unload liquid in said driving chamber, a passageway venting the source chamber to the driving chamber only when the piston unloads the liquid in the driving chamber, a relief valve releasing liquid from the driving chamber to the source chamber when pressure in the pumping chamber exceeds pressure in the driving chamber, means biasing the piston in an unloading direction to reduce pressure in the driving chamber following release of liquid therefrom, and means limiting the unloading stroke of the piston to maintain a volume in the driving chamber filled only by the liquid therein and the air released from said liquid.

21. The diaphragm pump of claim 20 having *a dead space in said pumping chamber and* an inlet valve limiting liquid flow into the pumping chamber on the suction stroke of the diaphragm to maintain [ a ] *said* dead space in the pumping chamber accommodating some movement of the diaphragm into the pumping chamber even when said pumping chamber is closed.

22. The diaphragm pump of claim 20 wherein the means limiting the unloading stroke of the piston maintains a pressure in the driving chamber substantially above the vapor pressure of the liquid therein so that any air released from said liquid follows the law of Henry.

23. A method of pumping fluids under variable flow conditions without varying or stopping the driving input which comprises driving a fluid pumping member with a driving fluid composed of liquid and gas, alternately pressure loading and unloading said driving fluid, releasing some of the driving fluid to provide a reduced driving volume for reduced actuation of said pumping member, and maintaining the pressure on the reduced volume of driving liquid above the vapor pressure thereof to accommodate any expansion of the reduced volume by separation of gas from the liquid.

24. The method of pumping a liquid through full flow, throttled and intermittently stopped conditions without throttling or stopping the driving input which comprises driving a liquid propelling member with a driving fluid composed of liquid and gas, releasing some of the driving fluid to accommodate throttling and intermittent stopping of the pumping, and maintaining minimum pressure on the driving fluid above the vapor pressure of the liquid.

25. The method of pumping through a wide range of flow rates and intermittent stopping of flow without changing driving input which comprises thrusting a driving liquid against a pumping diaphragm, unloading said liquid whenever pumping pressures exceed a predetermined level, and maintaining the liquid at all times above its vapor pressure.

26. The method of diaphragm pumping throughout a wide flow range without changing the driving input which comprises driving a diaphragm with a liquid containing a gas dissolved therein and releasing gas from the liquid under the law of Henry to accommodate throttled and intermittent stoppage of the pumping operation.

27. The method of diaphragm pumping a liquid throughout a wide range of flow and intermittent stopped conditions without throttling the driving input which comprises driving the diaphragm with a liquid containing a dissolved gas, controlling the flow of liquid into the diaphragm pumping chamber to maintain a dead space in the chamber accommodating movement of the diaphragm into the chamber even when the chamber is sealed, loading and unloading the driving liquid to reciprocate the diaphragm, releasing driving liquid to accommodate reduced reciprocation of the diaphragm during throttling and intermittent stopping of the pumping, and releasing air from the driving liquid on the suction stroke following the release of excess driving liquid to maintain pressure of the driving liquid always above its boiling point.

*28. A driven fluid pump device adapted to be throttled and stopped without throttling or stopping the driving*

*input which comprises, means defining a pumping chamber and a driving fluid chamber, a fluid propelling member separating said chambers, a driving fluid in said driving fluid chamber actuating said member and composed of liquid and gas, driving means for alternately pressure loading and unloading said driving fluid, means for releasing some of said driving fluid when loaded above a predetermined pressure to provide a reduced driving volume for reduced actuation of said propelling member, means maintaining minimum pressure on the driving fluid above the vapor pressure of said fluid whereby any expansion of the reduced driving volume upon unloading will be accommmodated by the remaining liquid and gas released therefrom, and means agitating at least portions of the driving fluid to add gas thereto.*

*29. A driven fluid pump device adapted to be throttled and stopped without throttling or stopping the driving input which comprises, means defining a pumping chamber and a driving fluid chamber, a fluid propelling member separating said chambers, a driving fluid in said driving fluid chamber actuating said member and composed of liquid and gas, driving means for alternately pressure loading and unloading said driving fluid, means for releasing some of said drive fluid when loaded above a predetermined pressure to provide a reduced driving volume for reduced actuation of said propelling member, means maintaining minimum pressure on the driving fluid above the vapor pressure of said fluid whereby any expansion of the reduced driving volume upon unloading will be accommodated by the remaining liquid and gas released therefrom, and means adding gas to the driving fluid.*

*30. A driven fluid pump device adapted to be throttled and stopped without throttling or stopping the driving input which comprises, means defining a pumping chamber and a driving fluid chamber, a fluid propelling member separating said chambers, a driving fluid in said driving fluid chamber actuating said member and composed of liquid and gas, driving means for alternately pressure loading and unloading said driving fluid, means for releasing some of said driving fluid when loaded above a predetermined pressure to provide a reduced driving volume for reduced actuation of said propelling member, means maintaining minimum pressure on the driving fluid above the vapor pressure of said fluid whereby any expansion of the reduced driving volume upon unloading will be accommodated by the remaining liquid and gas released therefrom, a supply chamber for driving fluid, a spring-loaded valve controlling release of driving fluid to said supply chamber, and agitating means in the supply chamber agitating the driving liquid in the chamber adding gas to said driving liquid.*

*31. The device of claim 30 wherein the supply chamber has a vent communicating the chamber with an exterior atmosphere effective to supply atmospheric gas to the chamber.*

*32. A driven pump adapted to be throttled or stopped without throttling or stopping the driving input comprising a housing defining a pumping chamber and a driving liquid chamber, a fluid propelling diaphragm member separating said chambers, driving means acting on liquid in the driving liquid chamber to actuate said propelling member for pumping fluid through the pumping chamber, a relief valve controlling maximum pressure in said driving liquid chamber and releasing excess liquid from the chamber to accommodate throttled movement of the diaphragm, means controlling the driving means to maintain pressure on the remaining liquid in the driving liquid chamber above the vapor pressure of the liquid, a source of driving liquid containing gas dissolved therein communicating with said relief valve to receive excess driving liquid from the driving liquid chamber, means connecting said source with the driving liquid chamber to replenish the chamber whenever pressure therein is below the pressure of the source, and means associated with the source adding gas to the driving liquid.*

*33. A driven pump adapted to be throttled or stopped without throttling or stopping the driving input comprising a housing defining a pumping chamber and a driving liquid chamber, a fluid propelling diaphragm member separating said chambers, driving means acting on liquid in the driving liquid chamber to actuate said propelling member for pumping fluid through the pumping chamber, a relief valve controlling maximum pressure in said driving liquid chamber and releasing excess liquid from the chamber to accommodate throttled movement of the diaphragm, means controlling the driving means to maintain pressure on the remaining liquid in the driving liquid chamber above the vapor pressure of the liquid, and said driving means being a constant stroke piston, said piston being driven by a driving device having at least portions thereof located in a source chamber for said driving liquid, the source chamber at least partially filled with driving liquid, a gas in said source chamber, and said portions agitating said driving liquid effective to entrain gas in the driving liquid.*

*34. The device of claim 33 wherein the portions include a rotating wobble plate in the source chamber partially submerged in the driving liquid.*

*35. The device of claim 34 wherein the wobble plate is driven by a motor located external of the source chamber.*

*36. A diaphragm pump comprising a housing defining a chamber for a source of lubricating liquid containing dissolved air, a driving chamber for said liquid and a pumping chamber, a diaphragm separating said driving and pumping chambers, a piston separating said source and driving chambers, means reciprocating said piston to load and unload liquid in said driving chamber, a passageway venting the source chamber to the driving chamber only when the piston unloads the liquid in the driving chamber, a relief valve releasing liquid from the driving chamber to the source chamber when pressure in the pumping chamber exceeds pressure in the driving chamber, means biasing the piston in an unloading direction to reduce pressure in the driving chamber following release of liquid therefrom, means limiting the unloading stroke of the piston to maintain a volume in the driving chamber filled only by the liquid therein and the air released from said liquid, said means reciprocating said piston having a portion thereof located in the source chamber effective to entrain additional air in said liquid by agitation thereof, said liquid with said additional air supplied to said driving chamber through said passageway.*

*37. A driven fluid pump device adapted to be throttled and stopped without throttling or stopping the driving input which comprises: means defining a pumping chamber and a driven fluid chamber, a fluid propelling member separating said chambers, a driving fluid in said driving fluid chamber actuating said member and composed of liquid and gas, means for adding gas to said liquid, driving means for alternatively pressure loading and unloading said driving fluid, means for releasing some of said driving fluid when loaded above a predetermined pressure to provide a reduced driving volume for reduced actuation of said propelling member, and means main-*

*taning minimum pressure on the driving fluid above the vapor pressure of said liquid whereby any expansion of the reduced driving volume upon unloading will be accommodated by the remaining liquid and gas released therefrom.*

*38. A driven pump adapted to be throttled or stopped without throttling or stopping the driving input comprising a housing defining a pumping chamber and a driving liquid chamber, a fluid propelling member separating said chambers, driving means acting on liquid in the driving liquid chamber to activate said propelling member for pumping fluid through the pumping chamber, a relief valve controlling maximum pressure in said driving liquid chamber and releasing excess liquid from the chamber to accommodate throttle movement of the diaphragm, and means controlling the driving means to maintain pressure on the remaining liquid in the driving liquid chamber above the vapor pressure of the liquid, the liquid including gas dissolved and entrained therein.*

*39. A driven pump device adapted to be throttled or stopped without throttling or stopping the driving input comprising in combination: a housing having a working chamber, a fluid propelling diaphragm dividing the chamber into a pumping chamber and opposed driving liquid chamber, a source of driving liquid, said source including a source chamber only partially filled with said driving liquid, means supplying gas to said source chamber, means in said source chamber agitating said driving liquid to entrain gas therein, piston driving means acting on said driving liquid in said driving chamber to alternately pressure load and pressure unload said driving liquid in said driving chamber to actuate said diaphragm for pumping fluid through the said pumping chamber, a relief valve controlling maximum pressure in said driving chamber and releasing excess driving liquid from the driving chamber to the said source chamber to accommodate throttled movement of the diaphragm when the driving liquid in the driving chamber is loaded above a predetermined pressure to provide a reduced driving volume of liquid in the driving chamber for reduced actuation of the diaphragm, passage means between said source chamber and the said driving chamber supplying driving liquid from said source chamber to the said driving chamber ahead of said piston for replenishing said driving chamber, and means maintaining minimum pressure on the driving liquid in the driving chamber above the vapor pressure of said liquid whereby any expansion of the driving liquid in the driving chamber upon pressure unloading will be accommodated by release of gas from the driving liquid in the driving chamber.*

*40. A diaphragm pump comprising a housing defining a chamber for a source of lubricating liquid containing dissolved air, a driving chamber for said liquid and a pumping chamber, a diaphragm separating said driving and pumping chambers, a piston separating said source and said driving chambers, means reciprocating said piston to load and unload liquid in said driving chamber, a passageway venting the source chamber to the driving chamber only when the piston unloads the liquid in the driving chamber, a relief valve releasing liquid from the driving chamber to the source chamber when pressure in the pumping chamber exceeds pressure in the driving chamber, means biasing the piston in an unloading direction to reduce pressure on the driving chamber following release of liquid therefrom, means limiting the unloading stroke of the piston to maintain a volume in the driving chamber filled only by the liquid therein and the air released from said liquid, and means in the source chamber agitating lubricating liquid therein and effective to entrain additional air in said lubricating liquid.*

*41. The pump of claim 40 wherein the means in said source chamber is operatively connected to said means reciprocating said piston.*

*42. The device of claim 41 wherein the means reciprocating said piston includes a rotating wobble plate positioned in said source chamber, the piston being spring biased against a face of said wobble plate, the wobble plate being only partially submerged in lubricating liquid in said source chamber, a vent in said source chamber communicating said source chamber to an outside atmosphere and effective to supply said atmosphere to said source chamber, and said wobble plate effective to agitate liquid in said source chamber to entrain atmospheric gas therein.*

*43. A method of pumping fluids under variable flow conditions without varying or stopping the driving input which comprises driving a fluid pumping member with a driving fluid composed of liquid and gas, positively adding gas to said liquid, alternately pressure loading and unloading said driving fluid, releasing some of driving fluid to provide a reduced driving volume for reduced actuation of said pumping member, and maintaining the pressure on the reduced volume of driving liquid above the vapor pressure thereof to accommodate any expansion of the reduced volume by separation of gas from the liquid.*

*44. The method of pumping a liquid through full flow, throttled and intermittently stopped conditions without throttling or stopping the driving input which comprises driving a liquid propelling member with a driving fluid composed of liquid and gas, agitating said liquid at a liquid-gas interface, adding gas to said liquid by said agitation, releasing some of the driving fluid to accommodate throttling and intermittent stopping of the pumping, and maintaining minimum pressure on the driving fluid above the vapor pressure of the liquid.*

*45. The method of diaphragm pumping a liquid throughout a wide range of flow and intermittent stopped conditions without throttling the driving input which comprises providing a liquid containing a dissolved gas, agitating said liquid and adding gas thereto, driving the diaphragm with the liquid containing the gas, controlling the flow of the liquid containing the gas into the diaphragm pumping chamber to maintain a dead space in the chamber accommodating movement of the diaphragm into the chamber even when the chamber is sealed, loading and unloading the driving liquid containing the gas to reciprocate the diaphragm, releasing driving liquid containing the gas to accommodate reduced reciprocation of the diaphragm during throttling and intermittent stopping of the pumping, and releasing portions of the air from the driving liquid on the suction stroke following the release of excess driving liquid to maintain pressure of the driving liquid in the diaphragm pumping chamber always above its boiling point.*

*46. A driven diaphragm pump adapted to be throttled and stopped without throttling or stopping the driving input which comprises a housing having a diaphragm chamber, a diaphragm in said housing spanning said chamber and dividing the chamber into a pumping chamber having a dead space and an opposed driving liquid chamber, a spring biased inlet valve for admitting pumpage to said pumping chamber, an outlet valve controlling flow of pumpage from said pumping chamber, a source of lubricating liquid having air dissolved therein, means bleeding liquid from said source to said driving chamber,*

*a relief valve controlling flow of liquid from the driving chamber back to the source, a piston acting on liquid in said driving chamber to load and unload said liquid for reciprocating said diaphragm to draw pumpage through the inlet valve into said pumping chamber and to discharge pumpage from the pumping chamber through the outlet valve, means driving said piston through a stroke to act through the liquid for forcing a full stroke of the diaphragm whenever pressure in the pumping chamber is below the pressure of the driving liquid, said relief valve releasing driving liquid from the driving chamber back to the source when pressure in the pumping chamber exceeds pressure on the driving liquid, the spring load on said inlet valve to the pumping chamber effective to limit flow of pumpage to maintain said dead space in the pumping chamber accommodating movement of the diaphragm into the pumping chamber even when the outlet valve is closed thereby minimizing release of driving liquid through the relief valve upon throttled operation of the pump, means limiting the stroke of the piston to maintain the driving liquid volume less than a volume occupied by the liquid and available air from the liquid to always sustain the liquid above its vapor pressure whereby reduced throttled diaphragm strokes are accommodated by reducing the volume of driving liquid and releasing air from the reduced volume of liquid to prevent vaporization of the liquid, said means driving said piston having portions thereof received in a chamber which is partly filled with said lubricating fluid and provides said source of lubricating fluid, said portions of the piston being only partly submerged in said lubricating fluid, said chamber being supplied with gas, and said portions of the piston agitating the lubricating liquid and adding gas thereto.*

*47. The method of pumping through a wide range of flow rates and intermediate stopping of flow without changing driving input which comprises providing a driving liquid, entraining a quantity of gas in said liquid by agitation thereof to provide a driving liquid-gas combination, thrusting the combination against a pumping diaphragm, unloading the combination whenever pumping pressures exceed a predetermined level, releasing portions of the gas from the combination during unloading and maintaining the liquid at all times above its vapor pressure.*

*48. The method of claim 47 including the step of reentraining portions of the released gas in the combination during thrusting.*

* * * * *